(12) United States Patent
Brasset

(10) Patent No.: US 7,540,394 B2
(45) Date of Patent: Jun. 2, 2009

(54) RIGIDIFIED FLEXIBLE MOULDING PLATE

(75) Inventor: Jean-François Brasset, Cran Gevrier (FR)

(73) Assignee: SEB SA, Ecully (FR)

( * ) Notice: Subject to any disclaimer, the term of this patent is extended or adjusted under 35 U.S.C. 154(b) by 566 days.

(21) Appl. No.: 10/484,343

(22) PCT Filed: Jul. 15, 2002

(86) PCT No.: PCT/FR02/02511

§ 371 (c)(1), (2), (4) Date: Jun. 30, 2004

(87) PCT Pub. No.: WO03/007769

PCT Pub. Date: Jan. 30, 2003

(65) Prior Publication Data

US 2004/0231527 A1 Nov. 25, 2004

(30) Foreign Application Priority Data

Jul. 17, 2001 (FR) .................................. 01 09544

(51) Int. Cl.
*A47J 27/00* (2006.01)
*A47J 36/00* (2006.01)
*A47J 37/01* (2006.01)

(52) U.S. Cl. ..................... 220/573.1; 220/657; 220/912

(58) Field of Classification Search ............. 220/573.1, 220/573.2, 641, 643, 644, 645, 657, 659, 220/904, 912

See application file for complete search history.

(56) References Cited

U.S. PATENT DOCUMENTS

| 3,229,886 | A | * | 1/1966 | Grogel | 220/608 |
| 3,233,813 | A | | 2/1966 | Wolford et al. | |
| 3,341,060 | A | * | 9/1967 | Rehrig | 220/643 |
| 3,545,645 | A | | 12/1970 | Smith | |
| 3,580,484 | A | | 5/1971 | Schneider | |
| 4,045,153 | A | * | 8/1977 | Maurino et al. | 425/440 |
| 5,132,336 | A | * | 7/1992 | Layton et al. | 523/100 |
| 2003/0071188 | A1 | * | 4/2003 | Bruno | 249/134 |

FOREIGN PATENT DOCUMENTS

| CH | 443 870 | 2/1968 |
| EP | 0 992 195 A1 | 4/2000 |
| FR | 1.590.193 | 5/1970 |
| FR | 2 658 034 | 8/1991 |
| FR | 2 767 048 | 2/1999 |

* cited by examiner

*Primary Examiner*—Anthony D Stashick
*Assistant Examiner*—Harry A Grosso
(74) *Attorney, Agent, or Firm*—Bachman & LaPointe, P.C.

(57) ABSTRACT

The mold for cooking comprises a base made of a flexible material possessing a side wall having a top end that defines an opening, and rigid reinforcement. The base further comprises a top ring extending radially outwards from the side wall at the opening. The annular reinforcement is fixed to the top ring around its entire periphery and at a predetermined distance from the opening.

10 Claims, 1 Drawing Sheet

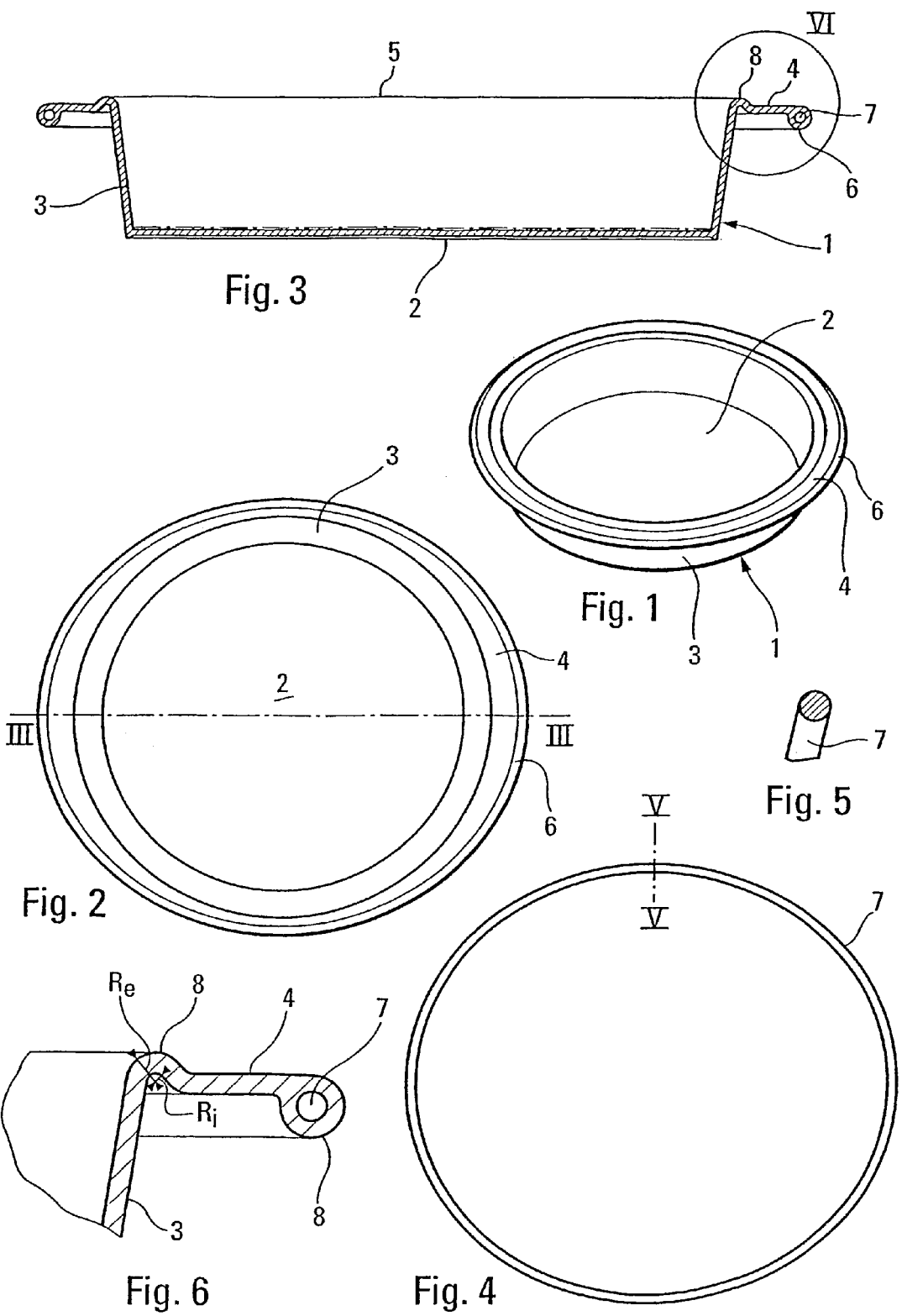

RIGIDIFIED FLEXIBLE MOULDING PLATE

BACKGROUND OF THE INVENTION

The present invention relates to a mold used to make culinary preparations of the cake, patisserie, type.

Molds made of metal material are known which present very high rigidity that does not facilitate unmolding the preparation.

Molds made of silicone are also known which have the advantage of being usable in an oven, a microwave, a refrigerator, a freezer, and a dishwasher without being spoiled, but which, as a result of the great elasticity of the material, lack rigidity. However, three drawbacks can be mentioned that stem from that great elasticity: unmolding the preparation is difficult; handling the mold is difficult as a result of the mold deforming easily; and the uncooked preparation (often liquid) can overflow easily while the mold is being handled.

Solutions have been proposed in order to obtain a mold that is sufficiently flexible by making localized extra thicknesses of material. However, the performance obtained for unmolding and for preventing the liquid preparation from overflowing are not always satisfactory.

French patent No. 1 590 193 describes a mold made of silicone elastomer for making confectionery, the mold being constituted by a flexible element in which a plurality of holes are made, and by rigid metal reinforcement embedded in the mass of the flexible element and extending over the entire height of the element. The confectionery is unmolded by exerting pressure on the bottom of the flexible element so as to turn it inside out, the entire height of the mold being stiffened. This unmolding operation is fiddly, requires fairly high force, and risks damaging the confectionery that is to be unmolded.

The problem posed is to make a novel mold for cooking that prevents the preparation, when liquid, from overflowing and that enables the preparation when solid to be unmolded very easily.

SUMMARY OF THE INVENTION

The solution proposed is a mold for cooking comprising both a base made of a flexible material possessing a side wall having a top end that defines an opening, and annular rigid reinforcement. According to the invention, the mold further comprises a top ring extending radially outwards from the side wall at the opening of the base, the annular reinforcement being fixed to the top ring around its entire periphery and at a predetermined distance from the opening.

As a result of this particular disposition of the reinforcement, it will readily be understood that the advantages of the flexibility of molds made of silicone-type material are conserved.

In addition, since the rigid reinforcement is localized solely at the opening of the base, and since it is offset radially therefrom, unmolding the culinary preparation is greatly facilitated: it suffices to exert a small amount of pressure downwards on the annular reinforcement, while the bottom of the mold is placed on a support. Driven by the top ring, the side wall of the mold is rolled down onto itself, making unmolding easy without applying force and without damaging the culinary preparation.

It is no longer necessary to exert pressure on the bottom of the mold, nor to turn the mold inside out, which is complicated and fiddly.

Contrary to the fears that a person skilled in the art may have, the fact of stiffening only the opening of the base, and at a certain radial distance therefrom, imparts sufficient rigidity to prevent the liquid preparation from overflowing while it is being handled.

The imparted rigidity is also sufficient to enable handles to be used, e.g. removable handles.

Another solution to the problem posed is a method of unmolding a culinary preparation from a mold comprising both a base made of a flexible material comprising a bottom wall and a side wall having a top end that defines an opening, and rigid reinforcement. In this solution, the bottom of the mold is placed on a support, and pressure towards the support is exerted on the reinforcement previously fixed around its entire periphery, at a predetermined distance, and at the opening, so as to roll down the side wall.

Other characteristics and advantages of the invention appear in the following description of an embodiment given by way of non-limiting example.

BRIEF DESCRIPTION OF THE DRAWINGS

In the accompanying figures:

FIG. 1 is a perspective view of a mold of the invention;

FIG. 2 is a plan view of a mold;

FIG. 3 is a view of a mold shown in section on axis III-III;

FIG. 4 is a plan view of rigid reinforcement used in a mold of the present invention;

FIG. 5 is a view of rigid reinforcement shown in section on axis V-V; and

FIG. 6 is an enlarged section view of zone VI of FIG. 3.

DETAILED DESCRIPTION OF THE PREFERRED EMBODIMENTS

As can be seen in FIGS. 1 and 3, the mold of the present invention comprises a base 1 made of a flexible material, e.g. silicone. The base 1 forms the receptacle in which a culinary preparation can be placed. The base comprises a bottom wall 2, a side wall 3, and a top ring 4 serving as a rim and which extends radially outwards from the top portion of the side wall 3.

For an opening 5 having a diameter of the order of 240 mm, the thickness of the ring 4 generally lies in the range 0.5% to 1.5% of said diameter, and is preferably 1%. In a preferred embodiment, the thickness of the ring 4 is of the same order as the thickness of the bottom and side walls 2 and 3, and preferably lies in the range 2 mm to 4 mm.

The top end of the side wall 3 defines an opening 5 via which the preparation can be introduced into the base 1. The annular end 6 of the top ring 4 situated at the opening 5 includes rigid reinforcement 7.

By way of example, the rigid reinforcement 7 can be made of a thermoset plastics material, or of metal such as stainless steel or aluminum. By way of example, the reinforcement 7 can be a stainless steel wire of diameter lying in the range 1 mm to 5 mm.

The reinforcement 7, disposed around the entire periphery of the mold, is situated at the opening 5. It is connected to the side wall 3 of the base 1 solely by the ring 4 at a predetermined distance from the opening 5.

This distance generally lies in the range 10 mm to 40 mm, it depends on the dimensions of the mold and can be determined easily by the person skilled in the art. For example, for a mold having an opening 5 that has a diameter of 240 mm, and having a height that is about 50 mm, the reinforcement 7 can be disposed at a distance from the opening 5 lying in the range 0.08 to 0.14 times said diameter, and preferably 0.12 times.

Because the reinforcement 7 is situated at the opening 5, because it is offset radially from said opening 5, and because it is connected to the base 1 solely by the ring 4, unmolding the culinary preparation is greatly facilitated: after placing the mold on a support, it suffices to exert a small amount of pressure at the annular end 6 of the ring 4. Driven by the ring 4, the side wall 3 rolls down, making unmolding easy without applying force and without damaging the culinary preparation.

In a particular embodiment, the annular ring 4 is connected to the top portion of the side wall 3 by means of a curved zone 8 having a radius of curvature that is directed substantially towards the bottom wall 2 of the base 1.

The zone 8 makes it easier to perform unmolding by constituting a starting curve for rolling down the side wall 3 during unmolding. The greatest force which is needed in order to rupture the angle made between the ring 4 and the side wall 3 is then no longer necessary (FIG. 6).

The inner radius of curvature Ri, which is the radius of curvature taken from the face of the ring 4 situated on its concave side, is easily determined by the person skilled in the art as a function of the rigidity of the side wall 3 of the base 1. In general, the inner radius of curvature Ri is not less than the thickness of the wall, is preferably greater than 1.2 times or even 1.5 times said thickness. For a base 1 made of silicone having a thickness of 2 mm, the outer radius of curvature Re, which is the radius of curvature taken from the face of the ring 4 situated on its side opposite from its concave side and which corresponds to the inner radius of curvature Ri plus the thickness of the ring 4, can lie in the range 5 mm to 10 mm.

In the example shown in FIGS. 1 to 5, the rigid reinforcement 7 is in the shape of an elliptical ring.

Naturally, it could be any other shape (circular, rectangular, square, etc.).

In the example shown in FIGS. 1 to 5, the ring 4 is continuous and is made of the same material as the base 1. Naturally, it would be possible to use a removable ring 4.

As can be seen in FIG. 3, the rigid reinforcement 7 is embedded in the material constituting the ring 4 at the annular end 6 of said ring. Naturally, it can be secured to said ring in permanent manner using any other means. It can also be fixed thereto in removable manner, e.g. by snap-fastening.

Although not shown in the figures, it is possible to have means at the reinforcement 7 that are adapted to co-operate with removable handles.

The invention claimed is:

1. A mold for cooking comprising: a flexible base made of silicone and possessing a side wall having a top end that defines an opening, a top ring extending radially outwards from the side wall at the opening of the base, an annular rigid reinforcement, and the annular reinforcement being fixed to the top ring around its entire periphery and at a predetermined distance from the opening, wherein a curved zone connects the top ring to the side wall and is at a higher level than the top ring.

2. A mold according to claim 1, wherein the top ring is continuous and is made of the same material as the base.

3. A mold made according to claim 1, wherein the annular reinforcement is made of metal.

4. A mold according to claim 1, wherein the annular reinforcement is made of a thermoset plastics material.

5. A mold according to claim 1, wherein the annular reinforcement is secured in a permanent manner to the ring.

6. A mold according to claim 5, wherein the annular reinforcement is embedded in the material constituting the top ring.

7. A mold for cooking comprising: a base made of a flexible material and possessing a side wall having a top end that defines an opening, a top ring extending radially outwards from the side wall at the opening of the base, and an annular rigid reinforcement embedded in the material constituting the top ring around the entire periphery of said top ring and at a predetermined distance from the opening, wherein a curved zone connects the top ring to the side wall and is at a higher level than the top ring.

8. A mold according to claim 7, wherein the top ring is continuous and made of the same material as the base.

9. A mold according to claim 7, wherein the annular reinforcement is made of metal.

10. A mold according to claim 7, wherein the annular reinforcement is made of a thermoset plastics material.

* * * * *